(12) United States Patent
Schultz

(10) Patent No.: US 9,429,394 B2
(45) Date of Patent: Aug. 30, 2016

(54) STAPLE FIBER CONDUCTIVE FABRIC

(71) Applicant: Gregory Russell Schultz, Marana, AZ (US)

(72) Inventor: Gregory Russell Schultz, Marana, AZ (US)

(73) Assignee: OLIVE TREE FINANCIAL GROUP, L.L.C., Tucson, AZ (US)

( * ) Notice: Subject to any disclaimer, the term of this patent is extended or adjusted under 35 U.S.C. 154(b) by 754 days.

(21) Appl. No.: 13/760,564

(22) Filed: Feb. 6, 2013

(65) Prior Publication Data

US 2014/0137725 A1 May 22, 2014

Related U.S. Application Data

(63) Continuation of application No. 12/628,648, filed on Dec. 1, 2009.

(51) Int. Cl.
| | |
|---|---|
| *F41H 1/02* | (2006.01) |
| *F41H 13/00* | (2006.01) |
| *D02G 3/44* | (2006.01) |
| *F41H 5/04* | (2006.01) |
| *B32B 5/26* | (2006.01) |
| *D04B 1/14* | (2006.01) |
| *F41H 5/02* | (2006.01) |

(52) U.S. Cl.
CPC .............. *F41H 5/0457* (2013.01); *B32B 5/26* (2013.01); *D02G 3/441* (2013.01); *D04B 1/14* (2013.01); *F41H 1/02* (2013.01); *F41H 5/02* (2013.01); *F41H 5/0471* (2013.01); *F41H 13/0012* (2013.01); *D10B 2401/16* (2013.01); *D10B 2501/04* (2013.01); *Y10T 428/249921* (2015.04); *Y10T 442/30* (2015.04); *Y10T 442/3382* (2015.04); *Y10T 442/40* (2015.04); *Y10T 442/425* (2015.04); *Y10T 442/475* (2015.04)

(58) Field of Classification Search
CPC ....... F41H 1/02; F41H 13/0012; D02G 3/441
USPC ................ 442/189, 197, 198, 301; 428/359; 57/252, 255, 256
See application file for complete search history.

(56) References Cited

U.S. PATENT DOCUMENTS

| | | |
|---|---|---|
| 3,454,277 A | 7/1969 | Mura |
| 3,553,675 A | 1/1971 | Shaver et al. |
| 3,917,891 A | 11/1975 | Cooke et al. |
| 4,485,426 A | 11/1984 | Kerls |

(Continued)

FOREIGN PATENT DOCUMENTS

| | | |
|---|---|---|
| CN | 2165408 | 5/1994 |
| GB | 221891 | 9/1924 |

(Continued)

OTHER PUBLICATIONS

Shieldex Trading USA, *Metallized Yarns Fibers & Fabrics*, advertisement, 2006, Palmyra, NY.

(Continued)

*Primary Examiner* — Jenna Johnson
(74) *Attorney, Agent, or Firm* — Stinson Leonard Street LLP

(57) ABSTRACT

A fabric for protecting a wearer thereof from an energy weapon. The fabric is made of a plurality of coupled strands. Each strand is made from staple fibers. At least 30% of the staple fibers are an electrically conductive material for conducting electric current from an energy weapon that contacts or is adjacent to the fabric.

34 Claims, 10 Drawing Sheets

(56) References Cited

U.S. PATENT DOCUMENTS

| | | |
|---|---|---|
| 4,487,583 A | 12/1984 | Brucker et al. |
| 4,557,968 A | 12/1985 | Thornton et al. |
| 4,590,623 A | 5/1986 | Kitchman |
| 4,602,385 A | 7/1986 | Warren |
| 4,606,968 A | 8/1986 | Thornton et al. |
| 4,684,762 A | 8/1987 | Gladfelter |
| 4,686,128 A | 8/1987 | Gentilman |
| 4,774,148 A | 9/1988 | Goto |
| 4,922,969 A | 5/1990 | Campman et al. |
| 4,943,885 A | 7/1990 | Willoughby et al. |
| 5,073,984 A | 12/1991 | Tone et al. |
| 5,248,548 A | 9/1993 | Toon |
| 5,354,950 A | 10/1994 | Golane |
| 5,399,418 A | 3/1995 | Hartmanns et al. |
| 5,401,901 A | 3/1995 | Gerry et al. |
| 5,472,769 A | 12/1995 | Goerz, Jr. et al. |
| 5,514,457 A | 5/1996 | Fels et al. |
| 5,617,713 A * | 4/1997 | Mawick .................. D02G 3/12 57/210 |
| 5,690,537 A | 11/1997 | Kalmus |
| 5,702,994 A | 12/1997 | Klosel |
| 5,736,474 A | 4/1998 | Thomas |
| 5,771,488 A | 6/1998 | Honkala |
| 5,799,329 A | 9/1998 | Hauschild |
| 5,804,291 A | 9/1998 | Fraser |
| 5,906,004 A | 5/1999 | Lebby et al. |
| 5,968,854 A | 10/1999 | Akopian et al. |
| 6,146,351 A * | 11/2000 | Kempe ............... A61F 13/0273 128/846 |
| 6,147,854 A | 11/2000 | Kirschner |
| 6,151,803 A | 11/2000 | Charles |
| 6,154,880 A | 12/2000 | Bachner, Jr. |
| 6,210,771 B1 | 4/2001 | Post et al. |
| 6,272,781 B1 | 8/2001 | Resnick |
| 6,371,977 B1 | 4/2002 | Bumbarger et al. |
| 6,684,404 B2 | 2/2004 | Bachner, Jr. et al. |
| 6,779,330 B1 | 8/2004 | Andrews et al. |
| 6,794,012 B2 | 9/2004 | Tsotsis |
| 6,807,891 B2 | 10/2004 | Fisher |
| 6,840,288 B2 | 1/2005 | Zhu et al. |
| 6,843,078 B2 | 1/2005 | Rock et al. |
| 6,961,227 B1 | 11/2005 | Whiton et al. |
| 7,206,183 B2 | 4/2007 | Sikes et al. |
| 7,284,280 B2 | 10/2007 | Schultz |
| 7,354,877 B2 | 4/2008 | Rosenberger et al. |
| 7,357,982 B2 | 4/2008 | Abe et al. |
| 7,635,517 B2 | 12/2009 | Douglas |
| 7,712,149 B2 | 5/2010 | Baldwin |
| 7,963,477 B2 | 6/2011 | Soula et al. |
| 8,001,999 B2 | 8/2011 | Schultz |
| 8,080,487 B2 | 12/2011 | Gardner et al. |
| 8,132,597 B2 | 3/2012 | Schultz |
| 2005/0042960 A1 | 2/2005 | Yeh et al. |
| 2006/0177656 A1* | 8/2006 | Kolmes .................. D02G 3/047 428/364 |
| 2006/0230484 A1* | 10/2006 | Schultz ................ A41D 13/008 2/2.5 |
| 2007/0159753 A1 | 7/2007 | Randall et al. |
| 2007/0259704 A1 | 11/2007 | Jung |

FOREIGN PATENT DOCUMENTS

| | | |
|---|---|---|
| RU | 2004100971 | 6/2005 |
| WO | WO 86/03050 | 5/1986 |
| WO | WO 92/11899 | 7/1992 |

OTHER PUBLICATIONS

Silverell, *EMF/EMI Shielded Tents & Shielded Pouches*, http://finesilver-productsnet.com/emteandpo.html, 2006.

Lin, et al., Ballistic-resistant stainless steel mesh compound non-woven fabric, *Fiber and Polymers*, vol. 9, No. 6, pp. 761-767, DOI: 10.1007/s12221-008-0119-9. Abstract only (1 pg.), 2008.

International Search Report and Written Opinion dated Jan. 4, 2011 for PCT/US2010/54501, 8 pages.

Whitehead, *A Rational Response to Taser Strikes*, JEMS, May 2005, downloaded from the internet at http://www.charlydmiller.com/LIB06/2005MayJEMSTaser.pdf on Mar. 4, 2011, 7 pgs.

* cited by examiner

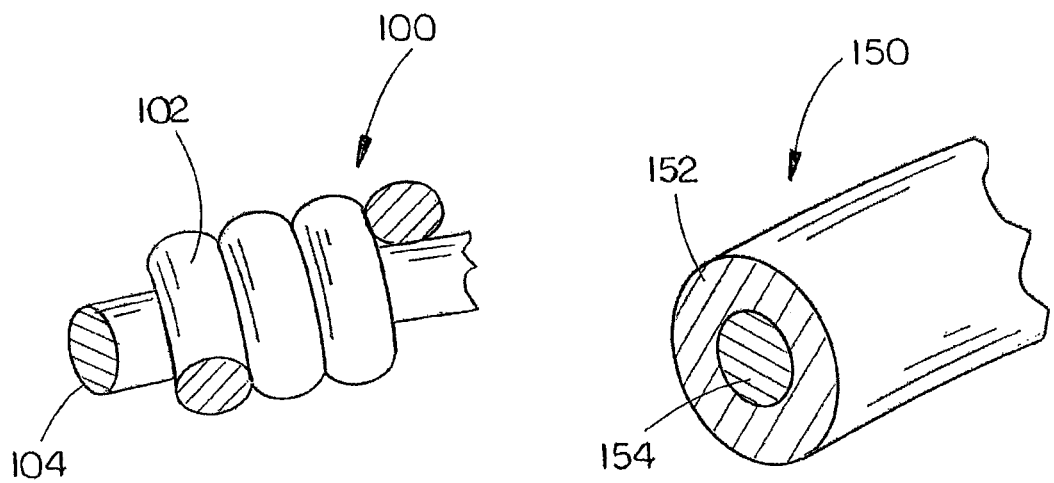
FIG. 8
FIG. 9
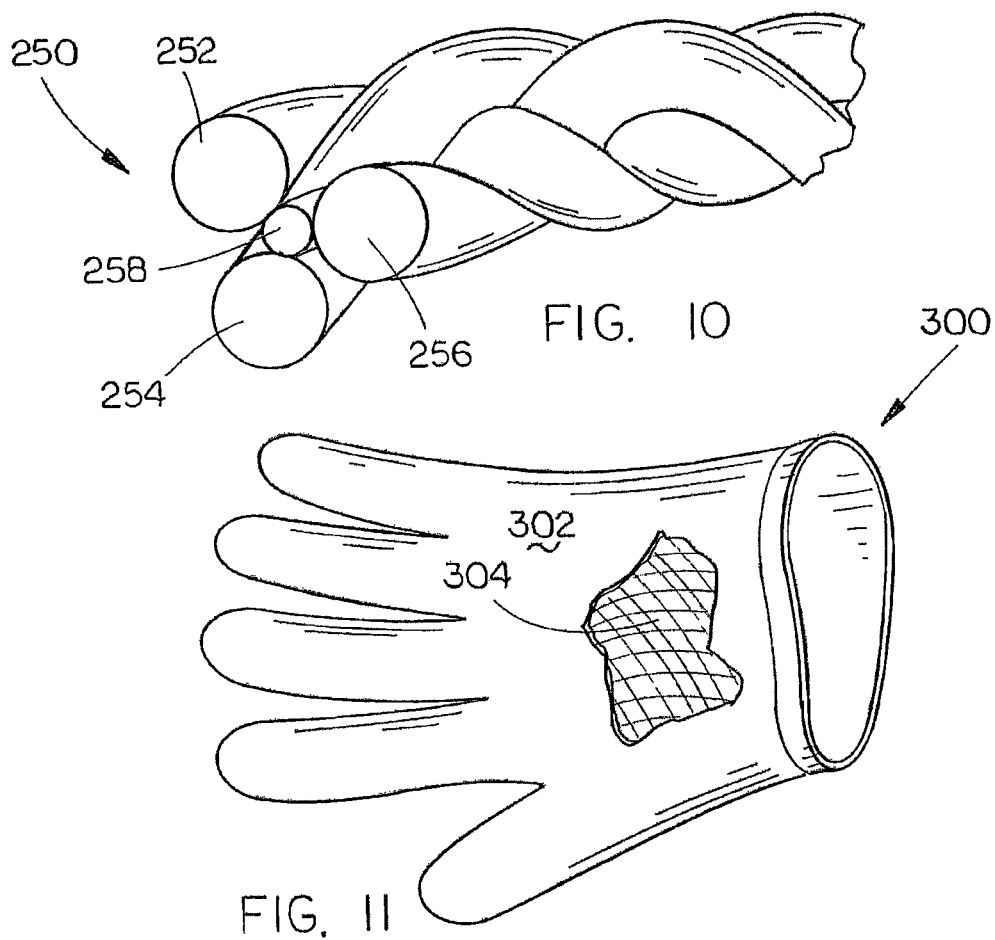
FIG. 10
FIG. 11

STAPLE FIBER CONDUCTIVE FABRIC

CROSS-REFERENCE TO RELATED APPLICATIONS

This application is a Continuation of U.S. patent application Ser. No. 12/628,648, filed on Dec. 1, 2009, which is incorporated herein by reference in its entirety.

STATEMENT REGARDING FEDERALLY SPONSORED RESEARCH OR DEVELOPMENT

Not Applicable.

BACKGROUND OF THE INVENTION

1. Field of the Invention

The invention relates generally to a fabric and, more particularly, to a fabric for protecting a wearer thereof from an energy weapon.

2. Description of Related Art

There are many different types of protection devices which are used by law enforcement agents, military personnel, security guards, and others to prevent incapacitation or death during performance of their jobs. For example, there are "bullet-proof" vests which typically provide protection from bullets with ballistic panels constructed from high strength fibers such as aramid or polyethylene. These vests may also include metal and/or ceramic plates for protection from blunt force trauma and high velocity projectiles. Helmets and hand-held shields are also made from ballistic resistant material for protection from ballistic missiles. There are also garments manufactured from heat resistant materials such as NOMEX® aramid, which protect individuals such as firefighters and race car drivers during performance of their jobs.

There are also devices that provide protection from energy weapons such as TASER® weapons manufactured by TASER International, Inc., "stun-guns," and other electrical pulse-based assault devices. TASER® weapons typically have two explosive-propelled barbs and a wire connecting each barb to a power source within a hand-held housing. When the barbs embed in a target, the target's body completes the electric circuit between the barbs and rapid, high voltage, low current electric pulses are delivered to the target from the power source, thus incapacitating the target. A "stun-gun" operates similarly, but instead of explosive propelled barbs, a "stun-gun" typically has a housing with two electrical leads projecting slightly from the housing. Thus, a "stun-gun" operator must be in close proximity to incapacitate a target.

One type of energy weapon protection device comprises a garment having two insulating panels sandwiching a conductive panel. When the barbs or leads of an energy weapon contact this device, electric current flows through the conductive panel of the protective device instead of through the target wearing the device. Thus, the device protects the target from incapacitation typically caused by an energy weapon.

BRIEF SUMMARY OF THE INVENTION

The present invention is directed toward a fabric for protecting a wearer thereof from an energy weapon. The fabric comprises a plurality of coupled strands, which are preferably woven or knit, however, it is within the scope of the invention for the strands to be coupled in any manner. Each of the strands has a first, electrically non-conductive, fiber and a second, electrically conductive, fiber which is at least partially enclosed by the first fiber. The second fiber conducts electric current from an energy weapon when the leads of the energy weapon contact, or are adjacent to, the fabric, thus protecting a wearer of the fabric from the energy weapon. The fabric is easy to manufacture because the strands may be joined in any conventional manner, such as weaving or knitting. Further, the coupled strands may be easily integrated into a garment. For example, the strands may be joined to the outer surface of a ballistic missile resistant vest, or as a liner to the inner surface of a glove or shirt.

In a preferred embodiment, a third fiber made from an electrically non-conductive material is intertwined with the first fiber. The second electrically conductive fiber is at least partially enclosed by the combination of the first and third fibers. The first and third fibers may be made from any electrically non-conductive material, including heat resistant or penetration resistant materials and materials that promote moisture wicking. It is within the scope of the invention for each strand to have any number of fibers, and for each strand to be constructed from fibers of different materials.

According to another embodiment of the present invention, an energy weapon protection fabric comprises a plurality of coupled strands, each of which comprises coupled staple fibers. At least 30% of the staple fibers are electrically conductive for conducting electric current from an energy weapon when the leads of the energy weapon contact, or are adjacent to, the fabric, thus protecting a wearer of the fabric from the energy weapon. The staple fibers may be coupled by any means known in the art, such as ring spinning, open-end or rotor spinning, and friction spinning. Additionally, the strands present may be coupled by any means known in the art, including weaving or knitting. Before the present invention it was believed that continuous electrically conductive material was necessary to effectively protect a wearer from an energy weapon. With the present invention it was discovered that discontinuous electrically conductive staple fibers may be coupled together with non-electrically conductive staple fibers in the ratios specified herein to protect a wearer from an energy weapon. This discovery significantly reduces the cost of producing energy weapon protection fabrics and garments versus previous embodiments requiring continuous electrically conductive fibers.

In another embodiment, an energy weapon protection glove comprises a first, middle layer of fabric, a second, outer fabric layer joined with and enclosing the first fabric layer, and a third, inner fabric layer joined with and enclosed by the first fabric layer. The first, middle fabric layer is knit from strands of material containing electrically conductive fibers. Each strand comprises at least three plies. Each of the plies comprises at least 30% electrically conductive staple fibers, more preferably at least 50% electrically conductive staple fibers, and most preferably at least 60% electrically conductive staple fibers. The electrically conductive staple fibers conduct electric current from an energy weapon. Each of the plies may be coupled by any means known in the art, including by twisting with an S- or Z-twist. The second, outer fabric layer is made from electrically non-conductive material. The third, inner fabric layer is made from knit strands of material that contain at least 10% electrically conductive staple fibers and preferably at least a portion of elastic material. Most preferably, the strands of the third layer comprise at least 15% electrically conductive staple fibers. The elastic material of the third layer ensures that there are no gaps in the electrically conductive material of the first, middle layer, and the electrically conductive staple fibers of the third layer ensure that there is a sufficient amount of electrically conductive fibers in contact with each other to conduct the electric current of an energy weapon.

In an alternative embodiment of the present invention, an energy weapon protection garment for protecting a wearer's torso comprises first and second layers of fabric joined together. The first, outer layer of fabric comprises knit strands of material containing electrically conductive staple fibers. Each strand comprises at least three plies. Each of the plies comprises at least 30% electrically conductive staple fibers, more preferably at least 50% electrically conductive staple fibers, and most preferably at least 60% electrically conductive staple fibers. The electrically conductive staple fibers conduct electric current from an energy weapon. The second, inner layer of fabric is made from electrically non-conductive material.

In accordance with another alternative embodiment of the present invention, a ballistic missile resistant vest comprises an electrically non-conductive outer shell, which encloses a layer of energy weapon protection fabric and a layer of ballistic missile resistant material. The energy weapon protection fabric has a rear surface adjacent to the ballistic missile resistant material and a front surface adjacent to the outer shell. The energy weapon protection fabric comprises a plurality of woven strands. Each of the strands comprises at least 30% electrically conductive staple fibers, and most preferably comprises at least 40% electrically conductive staple fibers.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 8 is a partial perspective view of a strand of fabric according to an alternative embodiment of the present invention;

FIG. 9 is a partial perspective view of a strand of fabric according to another alternative embodiment of the present invention;

FIG. 10 is a partial perspective view of a strand of fabric according to another alternative embodiment of the present invention;

FIG. 11 is a pictorial view of a glove according to one embodiment of the present invention;

DETAILED DESCRIPTION OF PREFERRED EMBODIMENT

Figure 1:
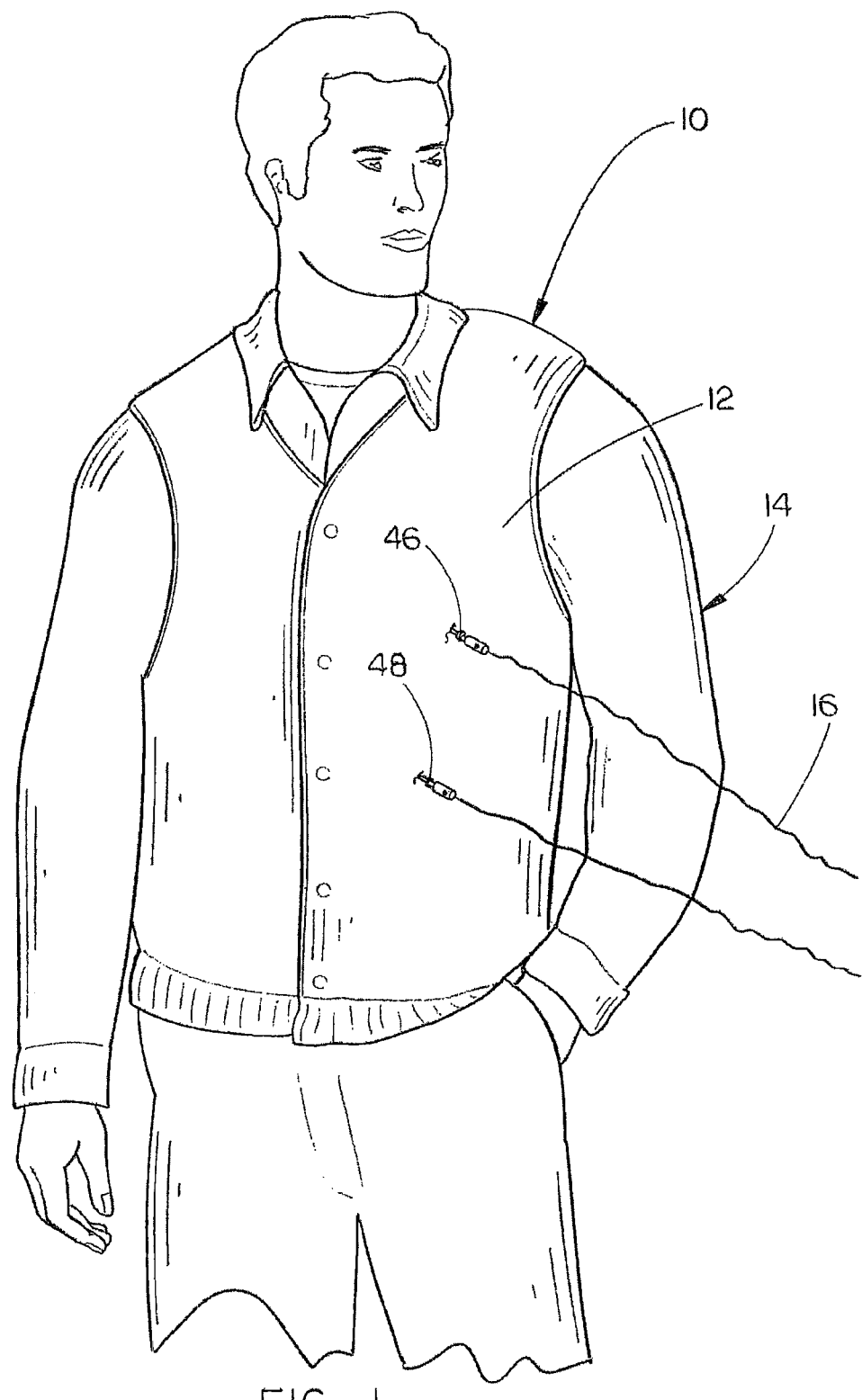
FIG. 1 is a pictorial view of a vest according to the present invention protecting the wearer thereof from the electric current generated by an energy weapon.

A vest according to one aspect of the present invention is indicated generally as 10 in FIG. 1. Vest 10 is worn upon the torso 12 of a wearer 14 for protecting the wearer from an energy weapon 16. Energy weapon 16 may be any type of energy weapon known in the art including "stun-guns" and devices manufactured by TASER International, Inc. headquartered in Scottsdale, Ariz. Vest 10 may also protect wearer 14 from heat or penetration from a ballistic missile such as a bullet or cutting instrument such as a knife. Preferably, vest 10 also wicks moisture from wearer 14. While FIG. 1 shows a vest, any type of garment configured to protect the wearer from an energy weapon is within the scope of the present invention including, but not limited to, gloves, shirts, undergarments, overcoats, pants, hats, and helmets. Further, the invention is not limited to a garment, and may consist of any of the protective fabrics described herein.

Figure 2:
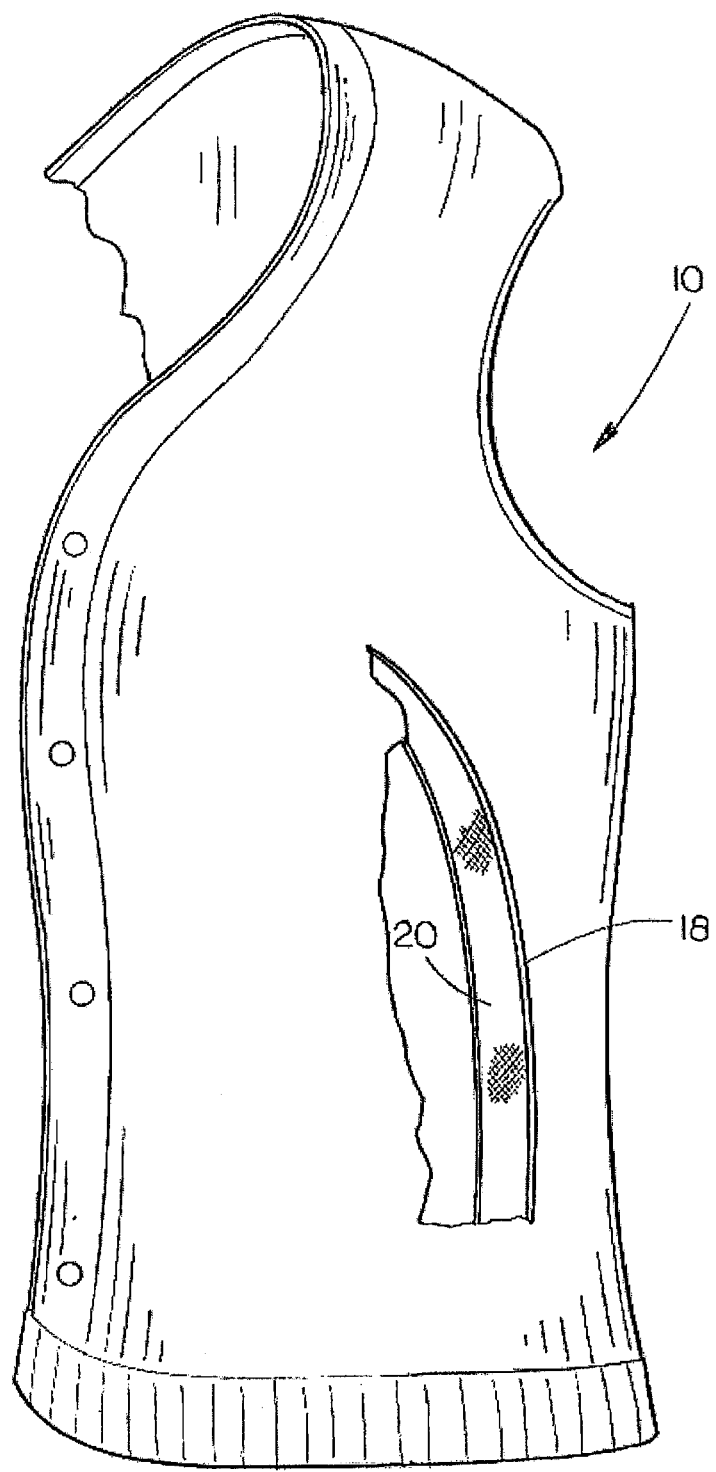
FIG. 2 is a partial cut-away view of the vest of FIG. 1 showing an outer layer and a liner of the vest.
Figure 3:
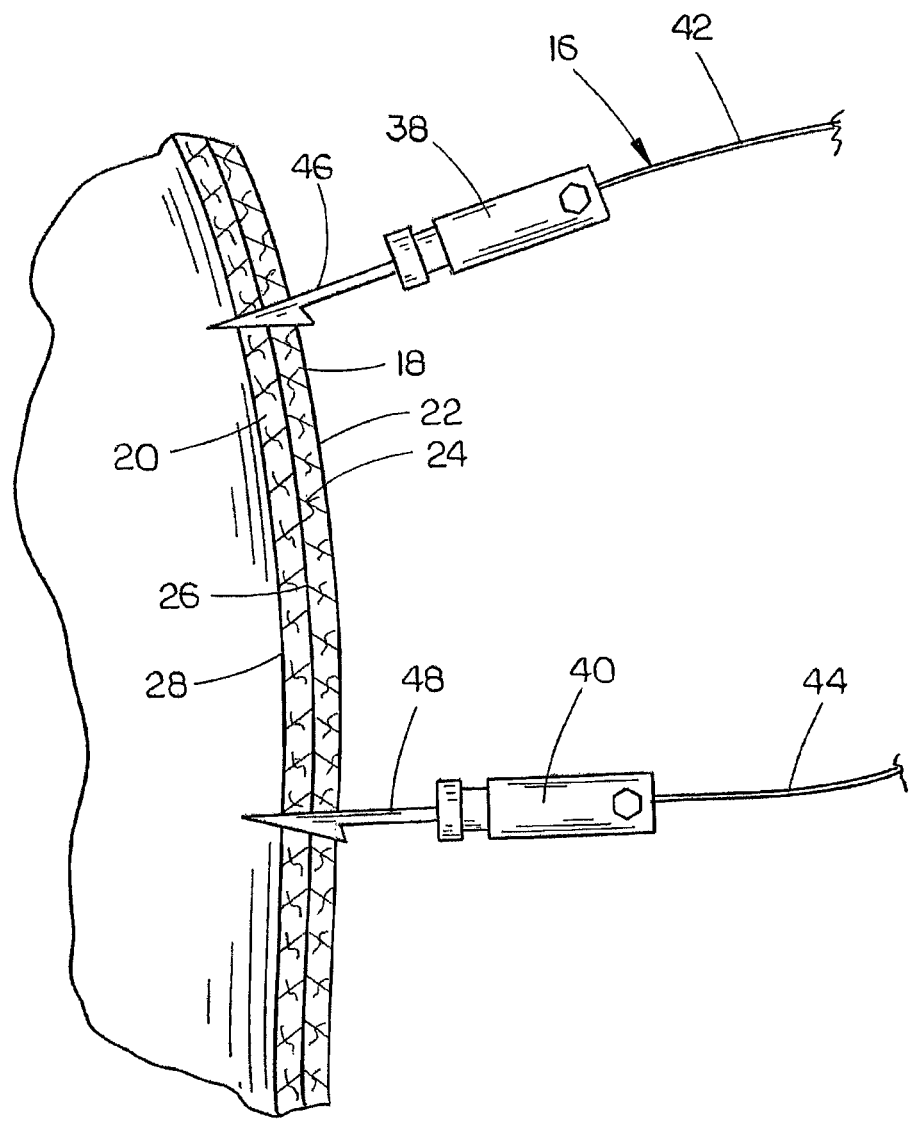
FIG. 3 is a partial cross-sectional view of the vest of FIG. 1 showing energy weapon barbs penetrating the vest.

Looking now to FIG. 2, vest 10 has an outer layer 18 and an inner layer, or liner, 20. Preferably, outer layer 18 is constructed from a first fabric and liner 20 is constructed from a second fabric, although it is within the scope of the invention for the outer layer and liner to be constructed from the same fabric. Preferably, outer layer 18 is made from a lightweight, breathable, and heat resistant material. Outer layer 18 is preferably made from cotton, but may be made from any material including but not limited to nylon, wool, polyester, polyamide, aramid, polypropylene, olefin, or any blend thereof. Additionally, it is within the scope of the invention for the outer layer 18 to be coated with a material to improve its heat resistance or resistance to electric current. As shown in FIG. 3, outer layer 18 has a front surface 22 and a rear surface 24, and liner 20 has a front surface 26 and a rear surface 28, which is adjacent the torso of wearer 14. Preferably liner 20 is stitched to outer layer 18 along seams thereof, although the liner and outer layer may be joined by any means known in the art including adhesive.

Figure 13:
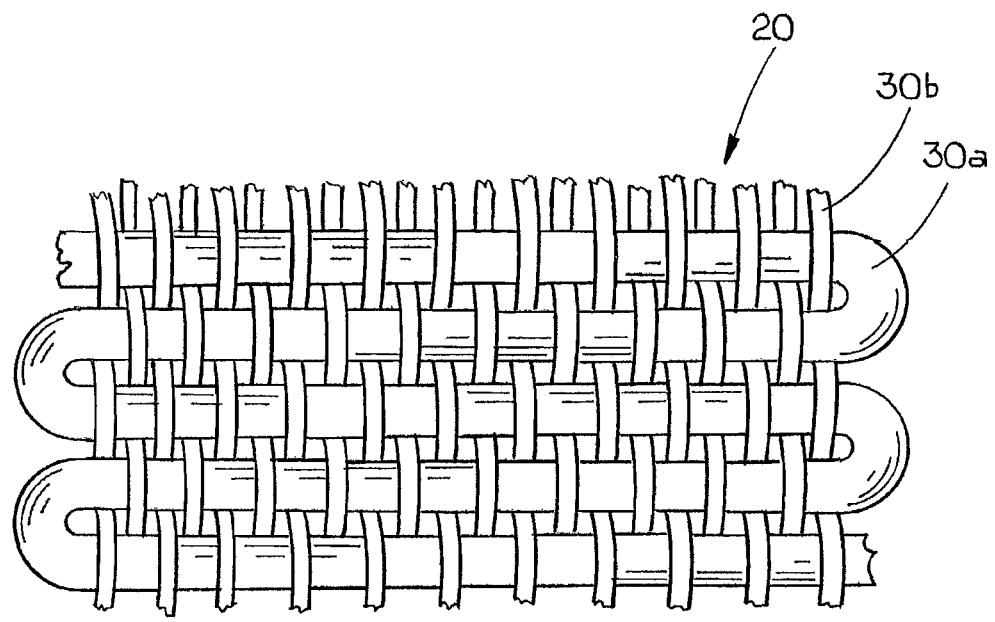
FIG. 13 is a detail view of a portion of the woven liner of the vest of FIG. 1.

Referring now to FIG. 13, liner 20 is woven by threading a weft strand 30a over and under alternating parallel warp strands 30b forming a weave commonly known as a plain weave. Weft strand 30a loops around the warp strands 30b at the sides of the fabric before threading back through the warp strands above the previous row formed by the weft strand. Although only one weft strand 30a is shown, it is within the scope of the invention for the liner 20 to be woven with a plurality of vertically spaced weft strands. Further, although liner 20 is shown as a plain weave, it is within the scope of the invention for the liner to be any type of weave known in the art including basket, twill, or satin. Although liner 20 is preferably woven from strands 30a and 30b, the liner 20 may also be knit from strands, such as strands 30a and 30b, or constructed by any other means known in the art for coupling strands.

Figure 4:
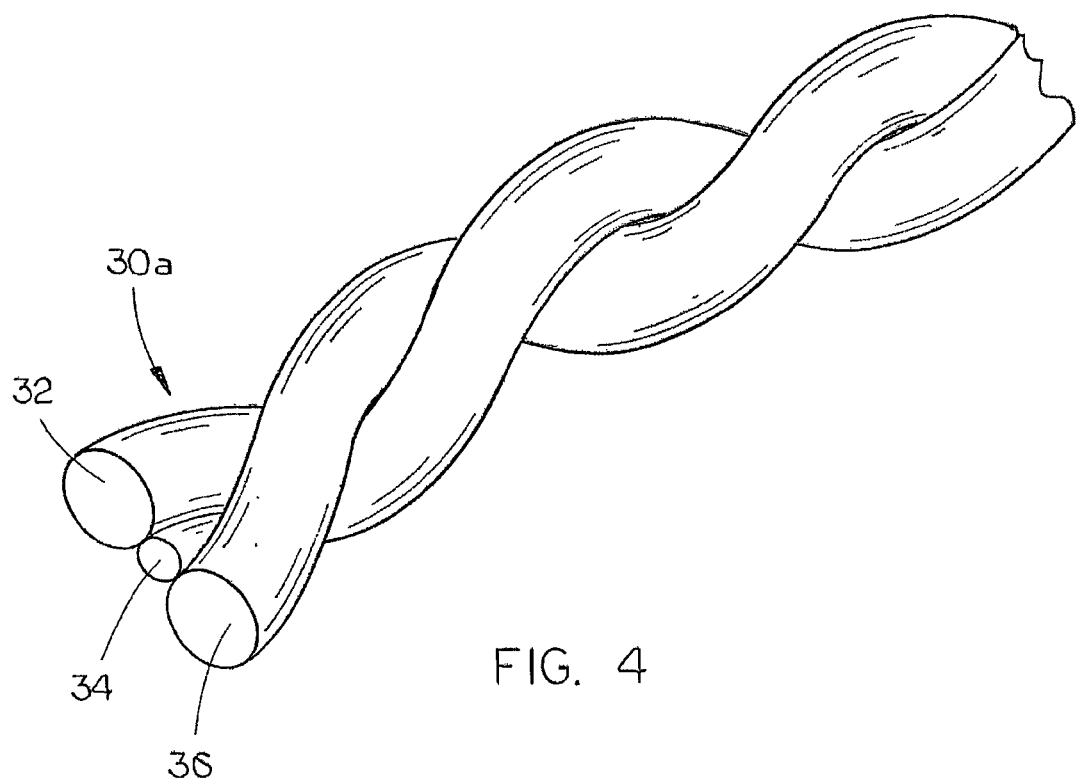
FIG. 4 is a partial perspective view of a strand of the liner of the vest of FIG. 1.

Referring now to FIG. 4, strand 30a has intertwined first, second, and third fibers 32, 34, and 36 respectively. Although strand 30b is shown in FIG. 13 with a smaller diameter than strand 30a, it is within the scope of the invention for the strands to be the same diameter or for strand 30b to have a larger diameter than strand 30a. Strand 30b preferably has the same construction as strand 30a and thus will not be discussed separately, however, it is within the scope of the invention for strands 30a and 30b to be formed from a different number of fibers or to be formed from different types of fibers. Additionally, it is within the scope of the invention for each of the warp and weft strands 30a and 30b, if more than one, to have a different construction. Intertwined first and third fibers 32 and 36 in combination enclose second fiber 34. Although first and third fibers 32 and 36 are shown enclosing second fiber 34, it is within the scope of the invention for a portion of second fiber 34 to be exposed such that first and third fibers 32 and 36 at least partially enclose second fiber 34. First and third fibers 32 and 36 are electrically non-conductive, while second fiber 34 is electrically conductive.

Preferably, first and third fibers 32 and 36 are cotton and polyester respectively, although it is within the scope of the invention for the first and third fibers to be any electrically non-conductive fiber such as nylon, polyester, polypropylene, olefin, wool, an aromatic polyamide fiber, commonly known as an aramid fiber, or any other type of electrically non-conductive fiber known in the art. In one embodiment of the present invention, in order to provide a penetration resistant liner 20, which can provide protection from ballistic missiles and/or cutting instruments, either or each of first and third fibers 32 and 36 is aramid formed from poly-paraphenylene terephthalamide, which is sold under the trade name KEVLAR® by E.I. du Pont de Nemours and Company ("DuPont"), or high-strength polyethylene fiber sold under the trade name SPECTRA® by Honeywell International Inc. In order to provide a heat resistant liner 20, either or each of first and third fibers 32 and 36 is aramid formed from poly(meta-phenyleneisophthalamide), which is sold under the trade name NOMEX® by DuPont. In order to provide a penetration resistant and heat resistant liner 20, first fiber 32 is a high strength fiber such as KEVLAR® aramid or SPECTRA® polyethylene, while third fiber 36 is a heat resistant fiber such as NOMEX® aramid. In order to provide a moisture wicking liner 20, either or each of first and third fibers 32 and 36 may be polyester. First fiber 32 may be a moisture wicking fiber such as polyester, while third fiber 36 is a high strength fiber such as KEVLAR® aramid or SPECTRA® polyethylene, or a heat resistant fiber such as NOMEX® aramid. Preferably, electrically conductive second fiber 34 is stainless steel, although it is within the scope of the invention for the fiber to be any electrically conductive material such as carbon fiber, copper, aluminum, or any blend or alloy thereof.

The majority of front and rear surfaces 26 and 28 of liner 20, shown in FIG. 3, are electrically non-conductive because electrically non-conductive first and third fibers 32 and 36 enclose electrically conductive second fiber 34, shown in FIG. 4. However, it is within the scope of the invention for portions of front and rear surfaces 26 and 28 to be electrically conductive if second fiber 34 is not completely enclosed by first and third fibers 32 and 36. Rear surface 28 is preferably electrically non-conductive to protect wearer 14 from electric current conducted by second fiber 34 and the heat generated therefrom. Front surface 26 is preferably electrically non-conductive to protect liner 20 and the wearer thereof from electric current if the liner 20 is inadvertently exposed to electric current from a power source such as a battery.

As shown in FIG. 3, energy weapon 16 has two leads 38 and 40 joined to the ends of electrically conductive wires 42 and 44. Wires 42 and 44 are electrically joined to a power source (not shown) that is operable to generate a voltage differential between the two wires. Barbs 46 and 48 are joined to leads 38 and 40 for penetrating the clothing of a target of the energy weapon 16. Energy weapon 16 has a similar configuration as any of the devices currently sold under the trade name TASER® by TASER International, Inc. Although energy weapon 16 is shown with wires, leads, and barbs, it is within the scope of the invention for vest 10 to protect wearer 14 from an energy weapon such as a "stun-gun" (not shown), which typically comprises a housing, two leads extending slightly from the surface of the housing, a power source such as a battery electrically connected to the leads, and a trigger operable to generate a voltage differential between the leads. Vest 10 protects wearer 14 from the incapacitating effects of a "stun-gun" (not shown) in the same manner as described below with respect to energy weapon 16.

Typically, when both leads of energy weapon 16 simultaneously contact, or are adjacent to, a target, the target completes the electric circuit allowing current to flow from the power source of the weapon, through one lead, through the target, through the other lead, and back to the power source. The electric current temporarily incapacitates the target. Vest 10 protects the target of energy weapon 16, because electric current flows through at least one of the electrically conductive second fibers 34 within strands 30a and 30b instead of flowing through the target. As shown in FIGS. 1 and 3, when energy weapon 16 is deployed against the wearer of vest 10, barbs 46 and 48 penetrate liner 20. If the energy weapon generates a voltage differential between wires 42 and 44, then the electric current will flow from the power source (not shown) of the energy weapon through wire 42 and barb 46, through at least one electrically conductive second fiber 34 of liner 20, through barb 48 and wire 44, and then back to the power source (not shown). Because each electrically conductive second fiber 34 within liner 20 has a much lower resistance to electric current than a human body, the electric current flows through at least one electrically conductive second fiber within liner 20 even if barbs 46 and 48 completely penetrate liner 20 and are in direct contact with wearer 14.

Vest 10 protects wearer 14 from an energy weapon, and incapacitation caused therefrom, even if only one lead of the energy weapon contacts the vest, or is directly adjacent the vest, while the other lead contacts wearer 14, or is directly adjacent the wearer. In this situation, electric current flows from the power source (not shown) through the lead of the energy weapon in direct contact with, or directly adjacent, wearer 14. Then, the current flows through the portion of the wearer between the energy lead in contact with the wearer and vest 10 until reaching at least one electrically conductive second fiber 34 of liner 20. Finally, the current flows through the lead of the energy weapon in direct contact with, or directly adjacent vest 10, and back to the power source (not shown). Even though electric current flows through a portion of wearer 14, vest 10 minimizes the amount of wearer's body exposed to electric current and thus greatly reduces any incapacitation caused by the energy weapon. It should also be appreciated that the electric current may flow in the opposite direction as described above.

Vest 10 also protects wearer 14 even if barbs 46 and 48 of energy weapon 16 do not make direct contact with the liner 20, but instead are only near or adjacent the liner. For example, if barbs 46 and 48 only partially penetrate outer layer 18, electric current will arc from each of the barbs through the remainder of outer layer 18 and electrically non-conductive front surface 26 of the liner to reach at least one electrically conductive second fiber 34 within liner 20. Likewise, if a stun-gun is activated adjacent vest 10, electric current will arc from each lead of the stun gun through the electrically non-conductive outer layer 18 and front surface 26 to reach at least one electrically conductive second fiber 34 within liner 20. Thus, vest 10 prevents wearer 14 from incapacitation caused by the electric current of energy weapon 16, or a "stun-gun" (not shown). Preferably, vest 10 is operable to protect wearer 14 from an energy weapon capable of generating up to twenty-six watts of power.

Referring now to FIGS. 2 and 3, outer layer 18 and liner 20 preferably each have a thickness of approximately one-sixteenth of an inch, or a thickness approximately equal to a typical shirt or sweatshirt. Preferably, liner 20 has a weight per area of approximately 100 to 250 grams per square meter, and most preferably between 150 to 200 grams per square meter, although it is within the scope of the invention for the liner to have any weight per area. This relatively high density weave ensures that if energy weapon 16 is deployed on a wearer 14 of vest 10, the barbs 46 and 48 of the energy weapon will contact, or be adjacent to, the electrically conductive fibers 34 of multiple strands 30a and 30b within liner 20. Liner 20 is preferably woven, as shown in FIG. 13, as opposed to knit, because vest 10 need not be flexible, as most knit fabrics are, to comfortably fit wearer 14, and to reduce the percentage by weight of electrically conductive fibers. Woven fabrics require a lesser percentage by weight of electrically conductive fibers versus electrically non-conductive fibers than knit fabrics in order to effectively protect wearer 14 from energy weapon 16. It is within the scope of the invention however for liner 20 to be knit from strands such as strand 30a, shown in FIG. 4, in the manner shown in FIG. 12 and described below. Preferably, the electrically conductive second fiber 34 of each of strands 30a and 30b in combination is approximately 25-45% of the weight of liner 20, and most preferably approximately 30% of the weight of the liner.

Although vest 10 is shown with an outer layer 18 and a liner 20, the vest need not have an outer layer 18 to effectively protect wearer 14 from energy weapon 16. Although strand 30a is shown with two intertwined fibers 32 and 36 enclosing second fiber 34, the strand may have any number of fibers enclosing second fiber 34, including one fiber as shown in the alternative embodiments of FIGS. 8 and 9 and described below, or three fibers as shown in the alternative embodiment of FIG. 10 and described below.

Figure 5:
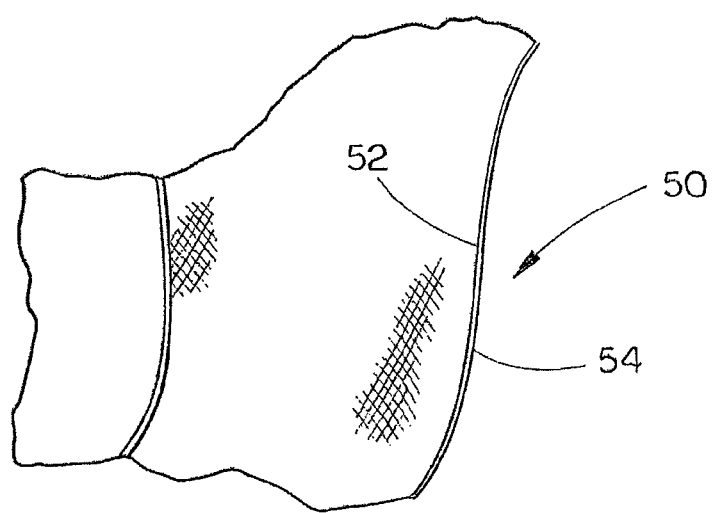
FIG. 5 is a partial perspective view of a fabric according to one embodiment of the present invention.

Looking now to FIG. 5, a fabric 50 according to one embodiment of the present invention is constructed from a plurality of joined strands, such as strand 30a shown in FIG. 4, preferably joined in a weave or knit. Like liner 20 described above in connection with FIGS. 1-4, each strand of fabric 50 contains at least one electrically conductive fiber, such as fiber 34 shown in FIG. 4, which protect a wearer thereof from an energy weapon in the same manner as described above in connection with liner 20 of vest 10, and at least one electrically non-conductive fiber at least partially enclosing the electrically conductive fiber. Fabric 50 has a front surface 52 and a rear surface 54 which are preferably electrically non-conductive although it is within the scope of the invention for either or both of the front and rear surfaces 52 and 54 to be electrically conductive. Fabric 50 may be incorporated into or affixed to any type of wearable garment, such as gloves, shirts, pants, overcoats, hats, helmets, body armor vests, and undergarments, or fabric 50 may be sewn as a patch onto any type of wearable garment such as those previously described. Additionally, fabric 50 may be used in any desirable manner to protect a human or animal from an energy weapon. The fibers of each strand of fabric 50 may be constructed with any of the materials described above with respect to liner 20. Further, each strand may have any number of fibers, and the strands of fabric 50 may be joined in any manner known in the art including weaving or knitting. Each strand of fabric 50 may also be constructed from different numbers of fibers or different types of fibers. Fabric 50 may also be identical to liner 20 described above in connection with FIGS. 1-4.

Figure 6:
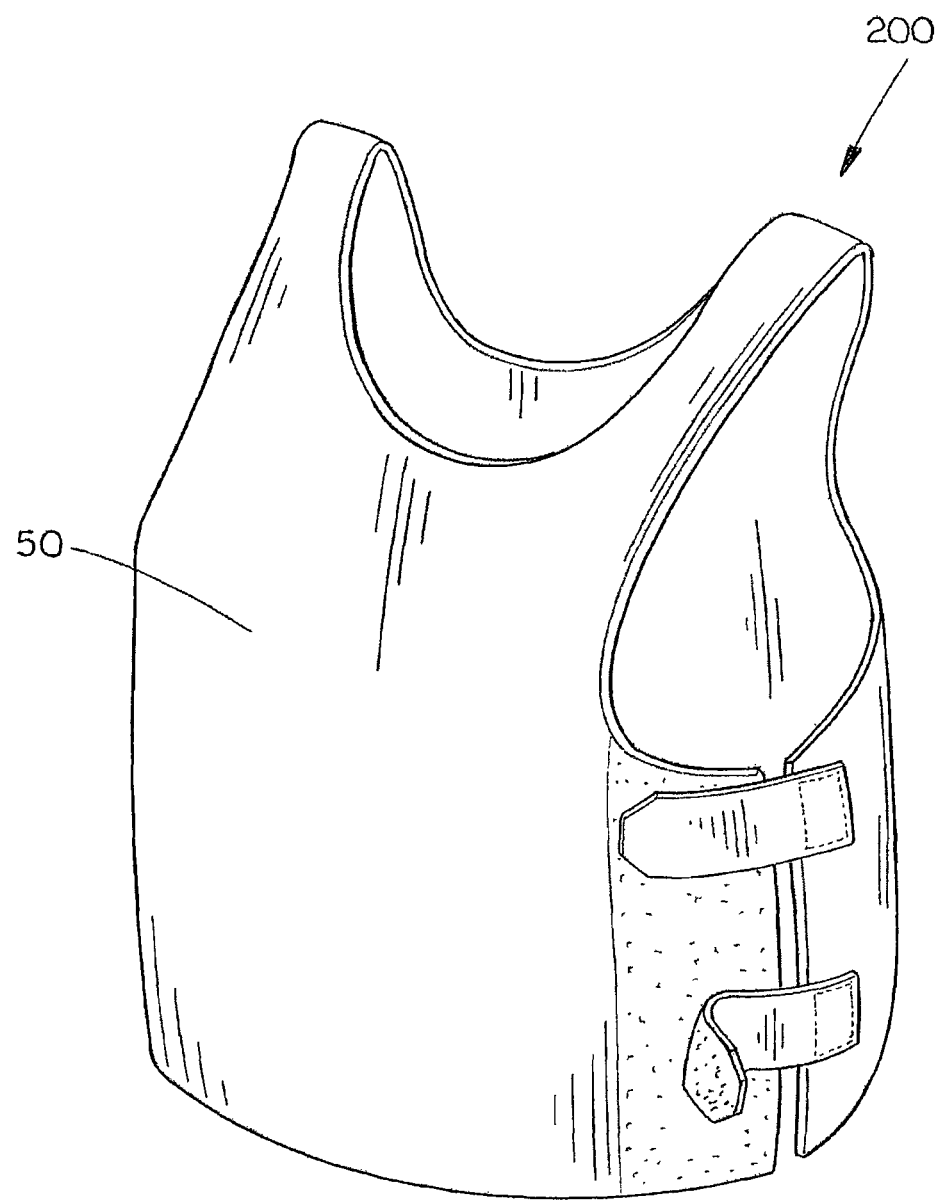
FIG. 6 is a pictorial view of a ballistic missile resistant vest according to one embodiment of the present invention.
Figure 7:
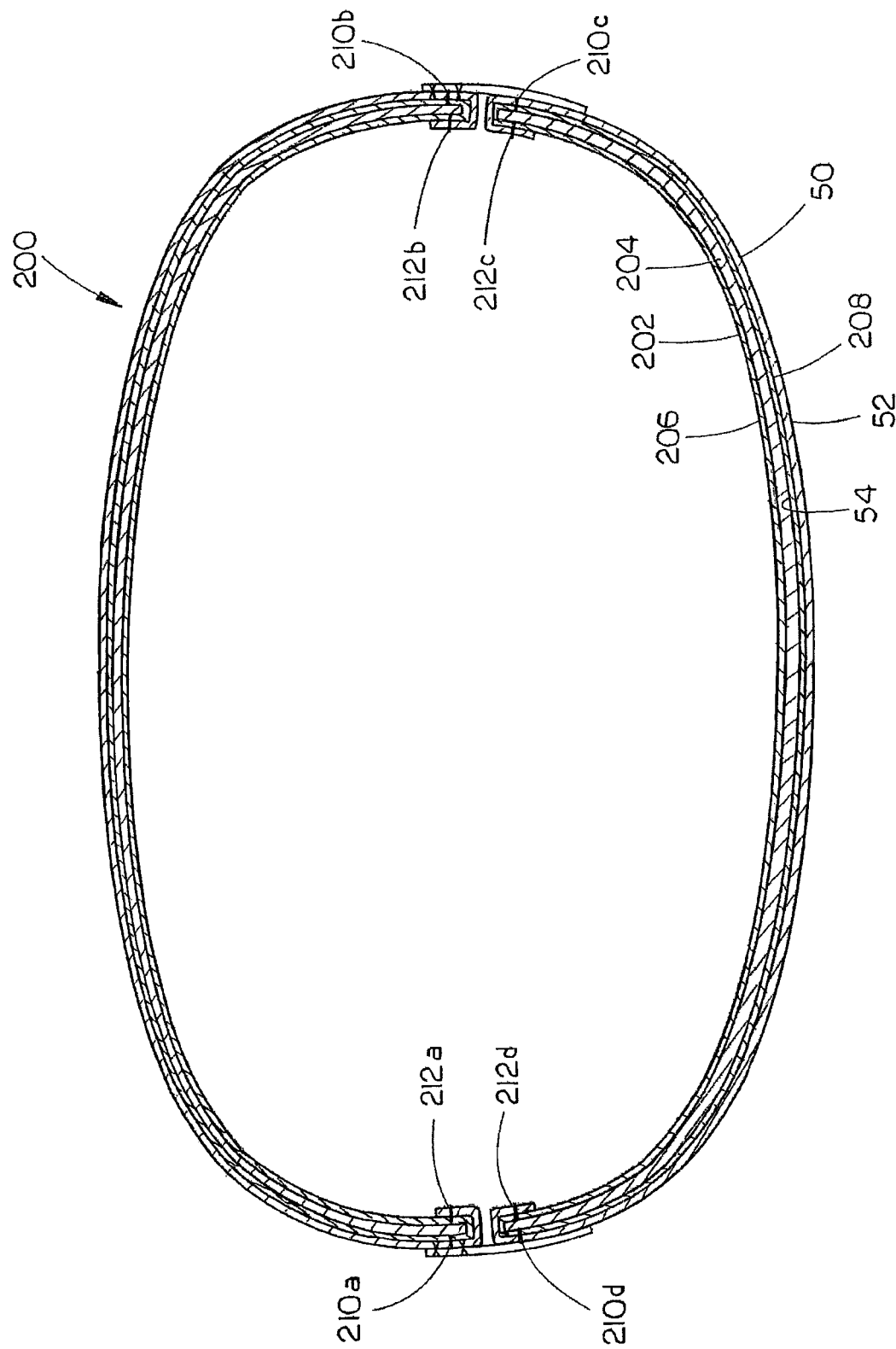
FIG. 7 is a cross-sectional view of the vest of FIG. 6.

Referring now to FIGS. 6 and 7, a body armor vest according to one aspect of the present invention is shown generally as 200. As shown in FIG. 7, vest 200 has an armor carrier 202 enclosing armor 204. Preferably, armor carrier 202 has an opening (not shown) for inserting and removing armor 204 therefrom. Preferably, a zipper or hook and loop fasteners (not shown) are joined to carrier 202 adjacent the opening (not shown) for securing the armor 204 within the carrier. Carrier 202 is preferably constructed from a lightweight, durable, flexible, breathable fabric. Carrier 202 is preferably constructed from nylon, but may be constructed from any material including but not limited to cotton, wool, polyester, polyamide, aramid, olefin, any blend thereof, or any other suitable material. Further, carrier 202 may be coated with a material to improve the heat resistance or electrical resistance of the carrier.

Armor 204 is preferably constructed from a lightweight material resistant to penetration from a ballistic missile and cutting instrument such as KEVLAR® aramid or SPECTRA® polyethylene. Carrier 202 has an inner surface 206, which is adjacent a wearer (not shown) of the vest, and an outer surface 208. Fabric 50, described above in connection with FIG. 5, is joined to outer surface 208 of carrier 202 via stitching 210a, 210b, 210c, and 210d and to inner surface 206 of carrier 202 via stitching 212a, 212b, 212c, and 212d. Although fabric 50 is shown joined to carrier 202 with stitching, it is within the scope of the invention for the fabric to be joined to the carrier using any means known in the art. Fabric 50 has a front surface 52 and a rear surface 54, which is adjacent outer surface 208 of carrier 202.

As described above with respect to FIG. 5, front and rear surfaces 52 and 54 of fabric 50 are preferably electrically non-conductive and fabric 50 contains electrically conductive fibers, such as fiber 34 of strand 30, shown in FIG. 4, which protect a wearer of vest 200 from an energy weapon. As shown in FIG. 7, fabric 50 covers the entire outer surface 208 of carrier 202 to protect a wearer of vest 200 from an energy weapon, such as energy weapon 16 described above and shown in FIGS. 1 and 3, or a "stun-gun" as described above. Fabric 50 covers outer surface 208, as opposed to covering inner surface 206, so the electric current from an energy weapon contacting, or adjacent to, vest 200 need not arc through carrier 202 and armor 204 to reach fabric 50. Electric current arcing through carrier 202 and armor 204 could undesirably raise the temperature of vest 200. Fabric 50 covers a portion of the inner surface 206 of carrier 202 so that a portion of fabric 50 is adjacent a wearer of the vest. It is desirable to have a portion of fabric 50 adjacent the wearer of the vest in the situation where one lead of an energy weapon directly contacts or is adjacent the wearer and the other lead directly contacts or is adjacent the vest. In this scenario, electric current from the energy weapon can flow from the lead contacting the wearer, through the wearer and into the portion of fabric 50 adjacent the wearer without arcing through carrier 202 and armor 204. Fabric 50 only covers a portion of the inner surface 206 of carrier 202 to minimize the capacitance of vest 200. If vest 200 has a high capacitance, then electric charge stored by the vest could undesirably discharge and potentially harm a wearer thereof.

Although in the preferred embodiment of vest 200, fabric 50 only covers the outer surface 208 of the carrier 202, it is within the scope of the invention for fabric 50 to only cover the inner surface 206 of the carrier 202 in spite of the potential for electric current arcing through carrier 202 and armor 204, or for the fabric 50 to cover both the inner and outer surfaces 206 and 208 of the carrier in spite of the potential capacitive effect of such a construction. Additionally, it is within the scope of the invention for fabric 50 to only cover the outer surface 208 of carrier 202 without having any portion of the fabric adjacent the inner surface 206 of the carrier. Further, it is within the scope of the invention for patches of fabric 50 to be discretely joined to either or both of the inner and outer surfaces 206 and 208 of carrier 202 for protecting a wearer of the vest from an energy weapon. Preferably, fabric 50, when joined to a body armor vest as in FIGS. 6 and 7, comprises woven strands such as strands 30a and 30b shown in FIGS. 4 and 13. Each strand preferably includes two electrically non-conductive fibers intertwined with one electrically conductive fiber such as strand 30a shown in FIG. 4. The two electrically non-conductive fibers are preferably a blend of polyester and cotton, which improve the durability of the fabric when the fabric is repeatedly exposed to cleaning products.

Looking now to FIG. 8, an alternative embodiment of strand 100 has a first fiber 102 encircling and enclosing a second fiber 104. First fiber 102 is preferably constructed from any of the electrically non-conductive materials described above in connection with strand 30a, and second fiber 104 is preferably constructed from any of the electrically conductive materials described above in connection with strand 30a. Strand 100 may replace either of strands 30a and 30b in the construction of liner 20, shown in FIGS. 1-4, or any of the strands of fabric 50 shown in FIG. 5.

FIG. 9 shows an alternative embodiment of strand 150 which may replace either of strands 30a and 30b in the construction of liner 20, shown in FIGS. 1-4, or any of the strands of fabric 50 shown in FIG. 5. Strand 150 has a first fiber 152 with a hollow core, and a second fiber 154 positioned within the hollow core of first fiber 152. First fiber 152 is preferably constructed from any of the electrically non-conductive materials described above in connection with strand 30a, and second fiber 154 is preferably constructed from any of the electrically conductive materials described above in connection with strand 30a.

Looking now to FIG. 10, an alternative embodiment of strand 250 has three intertwined fibers 252, 254, and 256 which in combination enclose a fourth fiber 258. Fibers 252, 254, and 256 are preferably constructed from any of the electrically non-conductive materials described above in connection with strand 30a, and fiber 258 is preferably constructed from any of the electrically conductive materials described above in connection with strand 30a. In one embodiment of strand 250, fiber 252 is a heat resistant material such as NOMEX® aramid, fiber 254 is a material that promotes moisture wicking such as polyester, fiber 256 is a ballistic missile and penetration resistant material such as KEVLAR® aramid or SPECTRA® polyethylene, and fiber 258 is an electrically conductive material such as stainless steel. Strand 250 may replace either of strands 30a and 30b in the construction of liner 20, shown in FIGS. 1-4, or any of the strands of fabric 50 shown in FIG. 5.

Figure 12:
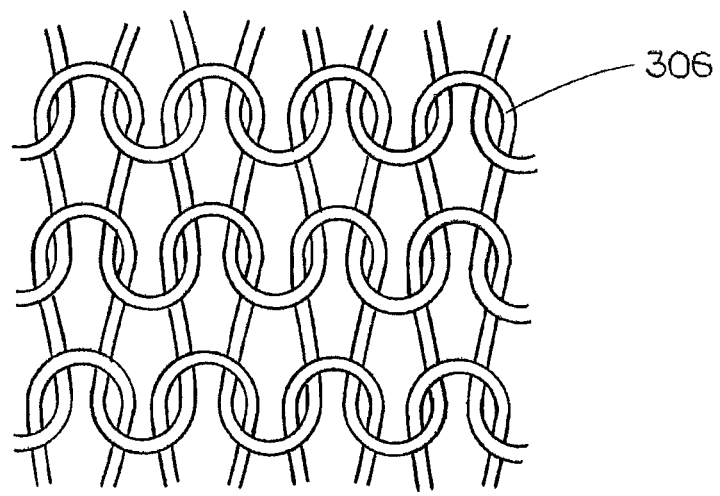
FIG. 12 is a detail view of a portion of the knit liner of the glove of FIG. 11.

Referring now to FIG. 11, a glove according to an alternative embodiment of the present invention is indicated generally as 300. Glove 300 has an outer layer 302 and an inner layer or liner 304. Outer layer 302 is preferably knit from a material such as cotton or wool, however it is within the scope of the invention for outer layer 302 to be woven and for the outer layer to be constructed from any material such as nylon, polyester, polyamide, aramid, polypropylene, or olefin. Outer layer 302 and inner layer 304 are preferably joined by stitching (not shown) although it is within the scope of the invention for the two layers to be joined by any means known in the art. Inner layer 304 is preferably knit from a plurality of identical strands 306, as shown in FIG. 12, however it is within the scope of the invention for the inner layer 304 to be woven or made from non-identical strands. Each strand 306 of inner layer 304 is preferably constructed in the same manner as strand 30a, shown in FIG. 4, but may also be constructed like strands 100, 150, or 250 shown in FIGS. 8, 9, and 10 respectively and described above. Preferably, the electrically non-conductive fibers are cotton to improve the comfort of glove 300, however it is within the scope of the invention for the electrically non-conductive fibers to be any of the fibers discussed above in connection with liner 20, shown in FIGS. 1-4. Likewise, it is within the scope of the invention for the electrically conductive fibers to be any of the fibers discussed above in connection with liner 20.

Liner 304 has a weight per area of approximately 250 to 300 grams per square meter, and most preferably 287 grams per square meter. Liner 304 is preferably knit, as opposed to woven, because a glove is preferably flexible in order to fit comfortably upon the hand of a wearer thereof. A liner according to the present invention constructed for a sock would also preferably be knit for the increased flexibility over that of a woven fabric. Preferably, the electrically conductive fibers of liner 304 are approximately 30 to 50% of the weight of the liner, and most preferably approximately 40% of the weight of the liner. The electrically conductive fibers for a knit liner according to the present invention preferably represent a greater percentage of the weight of a garment according to the present invention than a woven liner because the spacing between the adjacent strands 306 of a knit fabric, shown in FIG. 12, is typically greater than the spacing between the adjacent strands 30a and 30b of a woven fabric, shown in FIG. 13. Therefore, it is desirable to have larger electrically conductive fibers in a knit fabric to ensure that if an energy weapon is deployed on a wearer of the knit fabric, then the leads of the energy weapon will contact multiple electrically conductive fibers within the liner.

In operation, a user dons vest 10, fabric 50, vest 200, or glove 300, shown in FIGS. 1, 5, 6, and 11 respectively, for protection from an energy weapon, such as weapon 16, shown in FIG. 1. If the user is subjected to a voltage differential between the two leads 38 and 40 of the energy weapon, shown in FIG. 3, then the electrically conductive fiber 34 of each strand 30a and 30b of vest 10, the electrically conductive fibers of fabric 50, the electrically conductive fibers of vest 200, or the electrically conductive fibers of strands 306 of glove 300 conduct the electric current flowing from one lead of the energy weapon to the other lead of the energy weapon. Because the combination of the electrically conductive fibers within the vest 10, fabric 50, vest 200, or glove 300 has a much lower electrical resistance than a human body, no electrical current flows through the wearer of the vest, fabric, or glove.

Further, as described above, even if only one barb 46 or 48 of energy weapon 16 contacts or is adjacent the vest, fabric, or glove, while the other barb 46 or 48 contacts or is directly adjacent the target of the weapon, electric current will flow from the barb contacting or adjacent the target through the portion of the target between the barb and the vest 10, fabric 50, vest 200, or glove 300. Then the current flows into the electrically conductive fibers of the vest, fabric, or glove, and into the barb adjacent the vest, fabric, or glove. Thus, vest 10, fabric 50, vest 200, or glove 300 minimizes the incapacitating effect of an energy weapon by minimizing the distance that electric current flows through the target's body before the electric current reaches the conductive fibers of the vest, fabric, or glove. It is within the scope of the invention for vest 10, fabric 50, vest 200, or glove 300 to protect the wearer thereof from both penetrating energy weapons, such as weapon 16 shown in FIGS. 1 and 3, and non-penetrating energy weapons (not shown), such as a device described above and typically referred to as a "stun-gun."

Vest 10, fabric 50, vest 200, and glove 300, when fabricated with heat resistant fibers, penetration resistant fibers, or fibers that promote moisture wicking also protect the wearer thereof from heat, a ballistic missile such as a bullet, a knife, and provide increased comfort to the wearer by wicking away perspiration. Further, armor 204 of vest 200 provides increased protection to the wearer thereof from penetration from a ballistic missile or cutting instrument.

Staple Fiber Conductive Fabrics

Figure 14A:
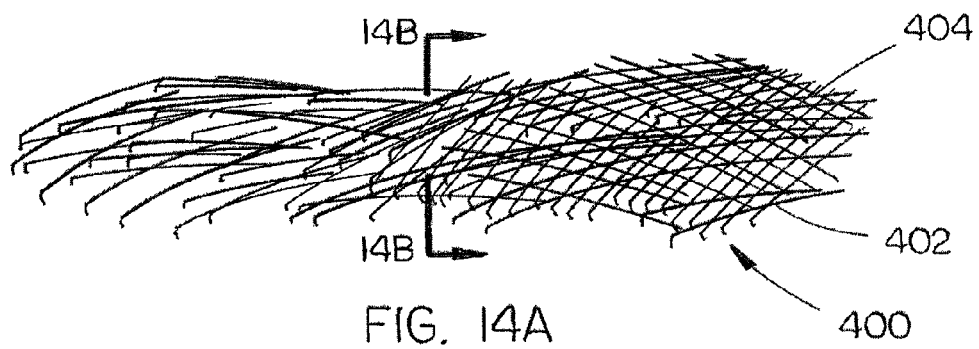
FIG. 14A is a detail view of a portion of a ply of a strand of fabric constructed from staple fibers in accordance with another embodiment of the present invention.
Figure 14B:
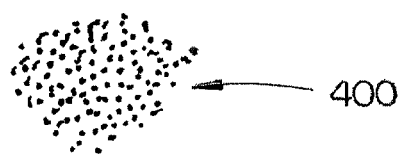
FIG. 14B is a cross-sectional view of the ply of FIG. 14A taken along the line 14B-14B.

Referring now to FIGS. 14A and 14B, a ply of thread made from staple fibers according to an alternative embodiment of the present invention is shown generally as 400. The ply 400 of staple fibers comprises both electrically conductive fibers such as fiber 402 and non-electrically conductive fibers such as fiber 404. The ply 400 is an elongate thread of staple fibers coupled by any manner known in the art. For example, the staple fibers may be coupled by ring spinning, open-end spinning, rotor spinning, friction spinning, core spinning, or adhesive. Additionally, the staple fibers making up ply 400 may undergo any other steps that are known in the textile arts for making fabric from staple fibers. For example, the electrically conductive and non-electrically conductive fibers may be mixed and blended, washed, combed, carded, drawn, and drafted before being spun or twisted into staple fiber ply 400.

Figure 15:
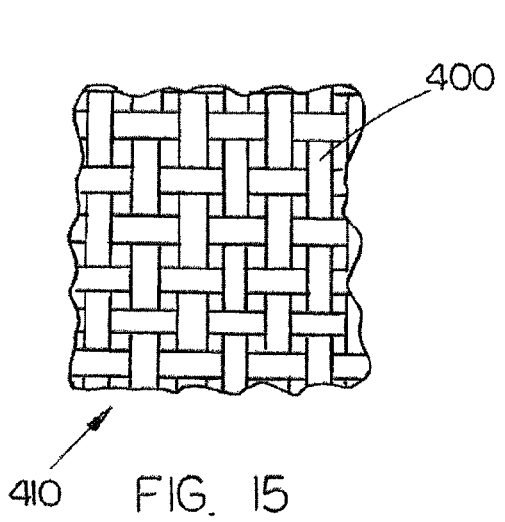
FIG. 15 is a detail view of a portion of energy weapon protection fabric woven from strands made from plies of staple fibers such as shown in FIG. 14A.
Figure 17:
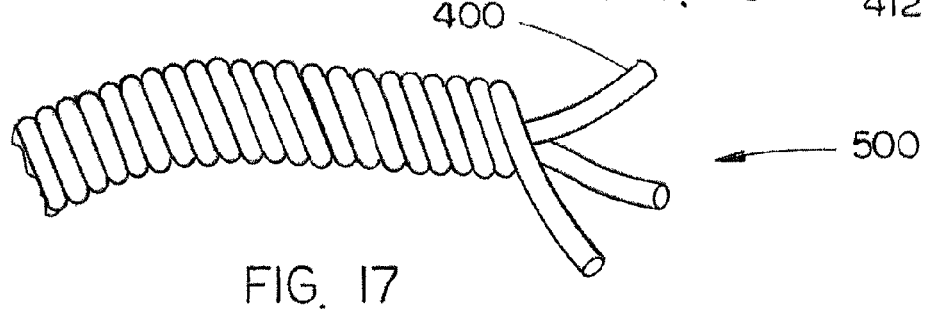
FIG. 17 is a detail view of a strand of fabric containing three plies made from staple fibers such as shown in FIG. 14A.

As discussed below, the ply 400 may be coupled or twisted with other plies or strands of twisted plies in any manner such as weaving and knitting to form fabric. For example, FIG. 15 shows ply 400 woven with other identical plies in a conventional weave pattern to form fabric 410. Additionally, ply 400 may be knit with other identical plies to form a knit fabric. For example, plies such as ply 400 could be used instead of the strands 306 shown in FIG. 12 to form a knit fabric as shown in FIG. 12. Preferably, if ply 400 is used in a knit fabric, then the ply 400 is first twisted with other identical plies into a strand 500 as shown in FIG. 17. Strand 500 shown in FIG. 17 is a three ply twisted strand made of three identical plies like ply 400 of FIG. 14A. To make strand 500 the plies 400 may be twisted in any manner known in the art including with a Z- or S-twist. Strands such as strand 500 may be used instead of the strands 306 shown in FIG. 12 to form a knit fabric as shown in FIG. 12. It should be understood that the plies and strands of the present invention may be woven or knit with any pattern in addition to the conventional knit and weave patterns shown in FIGS. 12 and 15, respectively. Additionally, it should be understood that the three ply strand 500 of FIG. 17 is exemplary only and a strand having any number of plies coupled together in any manner may be used in accordance with the present invention. Further, the strand 500 of FIG. 17 may be doubled or tripled by being twisted with other identical strands 500 before being woven or knit into a fabric.

The fabric formed with ply 400 or strand 500 in accordance with the present invention may be formed into any type of garment such as gloves, socks, undergarments, shirts, pants, vests, jackets, overcoats, hats, helmets, and any other type of garment described herein. The electrically conductive staple fibers 402 within each ply 400 making up a garment in accordance with the present invention are operable to conduct the electric current from an energy weapon and protect a wearer of the garment from the effects of an energy weapon. The electrically conductive staple fibers 402 are configured to conduct an electric current from an energy weapon that is adjacent to the fibers 402 in a similar manner as the electrically conductive material of vest 10 described above. Ply 400 differs from strand 30a of vest 10, shown in FIG. 4 and described above, because ply 400 comprises electrically conductive staple fibers, while strand 30a comprises a continuous electrically conductive fiber 34. As is well known in the textile arts, staple fibers typically have a length of between approximately 0.25 inches to approximately 20 inches. Any length of staple fibers may be used for the garments in accordance with the present invention. Preferably, however, the staple fibers have a length between approximately 0.4 to 10 inches, more preferably a length between approximately 0.4 to 6 inches, and most preferably a length between approximately 0.4 to 2.5 inches. The staple fibers used in garments according to the present invention may also have any diameter. To protect a wearer of a garment made from plies such as ply 400 from an energy weapon, electric current flows from one lead of the energy weapon to the other lead through a chain of adjacent electrically conductive staple fibers within the garment.

The ply 400 shown in FIGS. 14A and 14B comprises at least 30% electrically conductive staple fibers 402 to ensure that enough electrically conductive staple fibers contact or are adjacent to each other to conduct the current from an energy weapon, more preferably at least 50% electrically conductive staple fibers 402, and most preferably at least 60% electrically conductive staple fibers. As discussed below, for different types of fabric and garments the preferable percentage of electrically conductive staple fibers may vary. The electrically conductive staple fibers 402 are preferably stainless steel; however, it is within the scope of the invention for the electrically conductive staple fibers 402 to be any material including any of the electrically conductive materials described above. The electrically non-conductive staple fibers may be any type of material including any of the non-electrically conductive materials described above. The discovery of the present invention that electrically conductive staple fibers can be mixed with non-electrically conductive staple fibers in the ratios specified herein to protect a wearer from an energy weapon significantly reduces the cost of producing energy weapon protection fabrics and garments versus previous embodiments having continuous electrically conductive fibers.

Some of the non-electrically conductive fibers 404 may comprise a heat resistant material such as aramid, or a penetration resistant material such as aramid or polyethylene for improving the heat and/or penetration resistance of a fabric or garment made according to the present invention. Commercially available types of these heat resistant and penetration resistant materials are described above.

Figure 16:
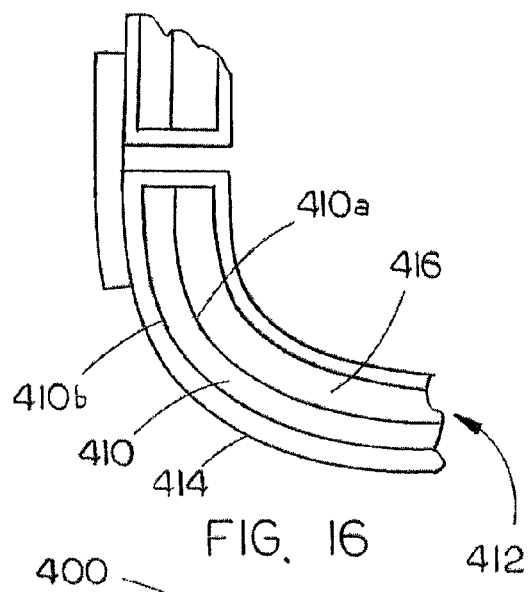
FIG. 16 is a cross-sectional view of a portion of an alternative embodiment of ballistic missile resistant vest containing the woven fabric of FIG. 15.

Referring now to FIG. 16, a body armor vest, or ballistic missile resistant vest, according to one embodiment of the present invention is shown generally as 412. Body armor vest 412 includes the woven energy weapon protection layer of fabric 410 described above and shown in FIG. 15 that is formed from plies of staple fibers identical to ply 400 shown in FIGS. 14A and B. Body armor vest 412 includes an outer shell 414, which encloses woven energy protection fabric 410 and armor, or ballistic missile resistant material, 416. The energy weapon protection fabric 410 has an inner surface 410a that faces a wearer of the vest 412 and an outer surface 410b that faces away from a wearer of the vest. The inner surface 410a of the fabric 410 is positioned adjacent to the armor 416 and the outer surface 410b is positioned adjacent to the outer shell 414. Outer shell 414 preferably has a similar configuration as carrier 202 of the body armor vest 200 shown in FIG. 7, and the outer shell 414 may be made from any of the materials described above with respect to the carrier 202. Outer shell 414 differs from carrier 202 in that there is no layer of fabric joined to the outer layer of outer shell 414; rather, the energy weapon protection fabric 410 of vest 412 is positioned within outer shell 414. Additionally, armor 416 preferably has a similar configuration as armor 204 of the body armor vest shown in FIG. 7, and the armor 416 may be made from any of the materials described above with respect to the armor 204.

When used in fabric 410 for vest 412, ply 400 is preferably a single ply strand of staple fibers. The ply 400 for fabric 410 used in vest 412 preferably has a length per weight of between approximately 20,000 to 30,000 yards per pound, more preferably between approximately 23,000 to 27,000 yards per pound, and most preferably between approximately 24,500 to 25,500 yards per pound, which corresponds with a cotton count of approximately 30 on a scale of 840 yards per pound or a denier of approximately 180. The fabric 410 for vest 412 preferably has a density of between approximately 160 to 200 threads per inch, more preferably between approximately 175 to 185 threads per inch, and most preferably approximately 180 threads per inch. Preferably, each ply 400 comprises at least 30% electrically conductive staple fibers and more preferably at least approximately 40% electrically conductive staple fibers to ensure that enough electrically conductive staple fibers are in contact with each other to effectively conduct the current from an energy weapon without harming or incapacitating a wearer of the vest 412. Preferably, each ply 400 comprises at least 30% stainless steel staple fibers, at least 30% cotton staple fibers, and at least 30% polyester staple fibers, and, more preferably, each ply comprises approximately 33% stainless steel staple fibers, approximately 30% cotton staple fibers, and approximately 37% polyester staple fibers.

Preferably, each ply 400 of fabric 410 for vest 412 has electrically conductive staple fibers with a length of between approximately 0.4 to 6 inches, more preferably between approximately 1 to 4 inches, and most preferably between approximately 2 to 3 inches. Preferably, the electrically conductive staple fibers of each ply 400 for fabric 410 have a diameter of between approximately 4 to 20 microns, more preferably a diameter of between approximately 6 to 15 microns, and most preferably a diameter of between approximately 8 to 12 microns. In a most preferred embodiment, 95% of the electrically conductive staple fibers used for fabric 410 have a diameter of between 8 to 12 microns and a length of between 2 to 3 inches. The ranges for ply length per weight, density, staple fiber length, staple fiber diameter, and percentage electrically conductive fibers ensure that the vest 412 will conduct the current from an energy weapon thereby preventing incapacitation or harm to the wearer thereof.

Although vest 412 preferably includes a woven energy protection layer of fabric 410, the vest 412 may also include an energy protection layer of fabric knit from strands containing staple fibers. Further, vest 412 may be woven or knit from strands of fabric that contain more than one ply which are twisted or coupled together by any means known in the art. The energy protection layer 410 of vest 412 is preferably configured to protect a wearer of the vest from an energy weapon capable of generating up to fifty watts of power, more preferably an energy weapon capable of generating between 10 to 50 watts of power, and most preferably an energy weapon capable of generating between 20 to 50 watts of power. The fabric 410 may also be used in other types of garments in addition to body armor vests, such as any of the garments described above.

Figure 18:
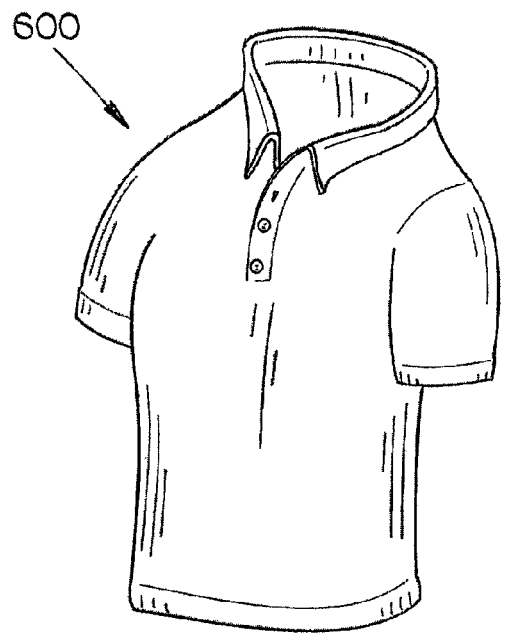
FIG. 18 is a pictorial view of an energy weapon protection shirt knit from strands of fabric such as shown in FIG. 17.
Figure 19:
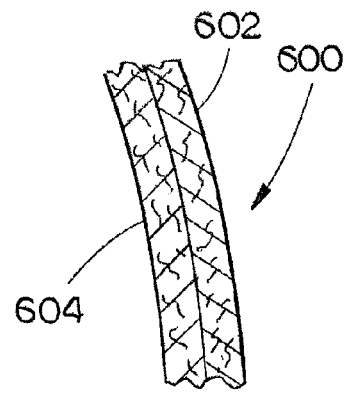
FIG. 19 is a partial cross-sectional view of the shirt of FIG. 18.

Referring now to FIGS. 18 and 19, a shirt 600 is shown in accordance with another embodiment of the present invention. As shown in FIG. 19, shirt 600 includes two layers of fabric, an outer layer of energy weapon protection fabric 602 and a non-electrically conductive inner layer of fabric 604 that is enclosed by the outer layer 602. The two layers of fabric 602 and 604 may be joined by any means known in the art, including stitching. The energy weapon protection fabric 602 of shirt 600 is preferably knit from a plurality of strands such as strand 500, which is shown in FIG. 17 and contains three plies identical to ply 400 of FIG. 14A. While the fabric 602 may be knit in any pattern, one type of pattern that the fabric 602 may be knit in is shown in FIG. 12. As discussed above, strands such as strand 500 can be used to make a garment from the knit pattern of FIG. 12 in lieu of strands 306.

Each ply 400 of strand 500 for fabric 602 preferably has a length per weight between approximately 12,000 to 22,000 yards per pound, more preferably between approximately 15,000 to 19,000 yards per pound, and most preferably between approximately 16,500 to 17,500 yards per pound, which corresponds with a cotton count of approximately 20 on a scale of 840 yards per pound. Each ply 400 also preferably comprises at least 30% electrically conductive staple fibers, more preferably at least 50% electrically conductive staple fibers, and most preferably at least 60% electrically conductive staple fibers to ensure that enough electrically conductive fibers are in contact with each other to effectively conduct the current from an energy weapon without harming or incapacitating a wearer of the shirt 600. Preferably, the electrically conductive staple fibers are stainless steel; however, any type of electrically conductive staple fibers may be used. Preferably, the non-electrically conductive staple fibers are cotton; however, any type of non-electrically conductive staple fibers may be used. In a most preferred embodiment, each ply 400 of the fabric 602 comprises approximately 60% stainless steel staple fibers and approximately 40% cotton staple fibers.

Preferably, the knit fabric 602 has a gauge of between approximately 10 to 15 and most preferably approximately 13. The knit fabric 602 preferably has a needle count of between approximately 65 to 95, and more preferably between approximately 73 to 88. The needle count used for fabric 602 preferably depends on the size of the shirt 600 that is being made with the fabric 602. For example, the needle count for an extra small shirt is approximately 73, the needle count for a small shirt is approximately 78, the needle count for a medium or large shirt is approximately 83, and the needle count for a large or extra large shirt is approximately 88. Preferably, each ply 400 of each strand 500 knit into fabric 602 has electrically conductive staple fibers with a length of between approximately 0.4 to 6 inches, more preferably between approximately 1 to 4 inches, and most preferably between approximately 2 to 3 inches. Preferably, the electrically conductive staple fibers of each ply 400 for fabric 602 have a diameter of between approximately 4 to 20 microns, more preferably a diameter of between approximately 6 to 15 microns, and most preferably a diameter of between approximately 8 to 12 microns. In a most preferred embodiment, 95% of the electrically conductive staple fibers used for fabric 602 have a diameter of between 8 to 12 microns and a length of between 2 to 3 inches.

Preferably, each strand 500 used to knit fabric 602 of shirt 600 has three plies of staple fibers identical to ply 400 as described above. It is also within the scope of the invention however for each strand 500 to have more or less than three plies. For example, the fabric 602 may be knit from strands comprising two three-ply strands identical to strand 500 that are twisted together.

The non-electrically conductive fabric layer 604 may be made from any material and most preferably is made from cotton, nylon, wool, polyester, polyamide, or aramid. The non-electrically conductive fabric layer 604 may also be made from a blend of different types of materials. Preferably, the layer 604 comprises a moisture wicking material to improve comfort to the wearer of shirt 600. The layer 604 also provides protection to the wearer of shirt 600 by spacing the wearer from the electrically conductive layer 602 when current flows through it. Preferably, fabric layer 604 is joined with layer 602 to minimize the gaps between the knit strands 500 of fabric 602 if the shirt 600 is stretched. It is important to minimize any gaps between the knit strands 500 of fabric 602 to ensure that enough electrically conductive staple fibers of the strands 500 are in contact with or adjacent to each other to effectively conduct the current from an energy weapon.

The above specified ranges for the gauge, needle count, staple fiber length, staple fiber diameter, percent electrically conductive material, number of plies per strand and length per weight for each ply also ensure that the shirt 600 will effectively conduct current from an energy weapon to protect its wearer from the effects of the energy weapon. In one embodiment, the layer 604 includes some elastic material such as spandex to reduce the gaps between the knit strands 500 of layer 602. Although shirt 600 preferably includes a knit energy protection layer of fabric 602, the shirt 600 may also include an energy protection layer of fabric woven from strands containing staple fibers. The energy protection layer 602 of shirt 600 is preferably configured to protect a wearer of the shirt from an energy weapon capable of generating up to fifty watts of power, more preferably an energy weapon capable of generating between 10 to 50 watts of power, and most preferably an energy weapon capable of generating between 20 to 50 watts of power. It is also within the scope of the present invention for layers 602 and 604 to be formed into any other type of garment described above.

Figure 20:
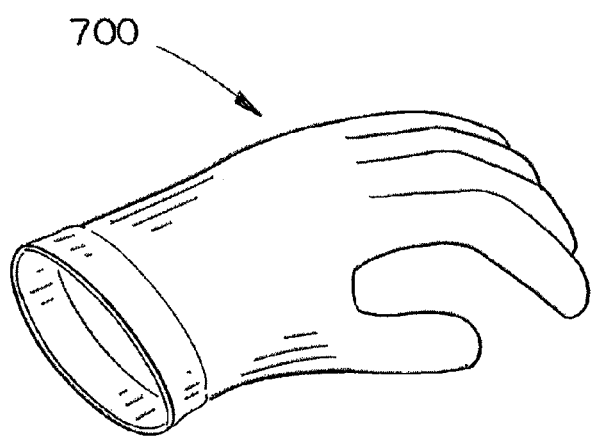
FIG. 20 is a pictorial view of an energy weapon protection glove knit from strands of fabric such as shown in FIG. 17.
Figure 21:
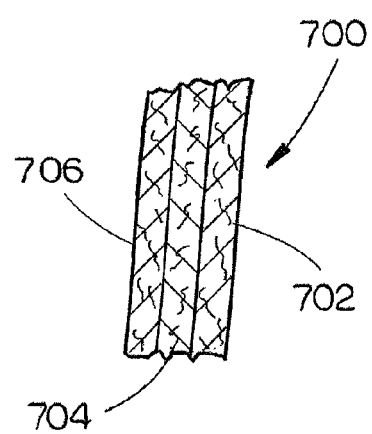
FIG. 21 is a partial cross-sectional view of the glove of FIG. 20.

Referring now to FIGS. 20 and 21, a glove in accordance with another embodiment of the present invention is shown generally as 700. Glove 700 is configured to protect a wearer's hand from the incapacitating effects of an energy weapon. As shown in FIG. 21, glove 700 includes three layers of fabric 702, 704, and 706 that are joined together by any means known in the art including stitching. Outer layer 702 encloses middle layer 704, which encloses inner layer 706. The outer layer 702 is made from a non-electrically conductive material, while each of the middle and inner layers 704 and 706 comprise some electrically conductive material. The middle layer 704 is preferably knit from strands such as strand 500 shown in FIG. 17. As discussed above strand 500 comprises three twisted plies 400 each having electrically and non-electrically conductive staple fibers. The layer 704 may be knit in any pattern including the one shown in FIG. 12.

For middle fabric layer 704 of glove 700, each ply 400 of strand 500 preferably has a length per weight between approximately 12,000 to 22,000 yards per pound, more preferably between approximately 15,000 to 19,000 yards per pound, and most preferably between approximately 16,500 to 17,500 yards per pound, which corresponds with a cotton count of approximately 20 on a scale of 840 yards per pound. Each ply 400 also preferably comprises at least 30% electrically conductive staple fibers, more preferably at least 50% electrically conductive staple fibers, and most preferably at least 60% electrically conductive staple fibers to ensure that enough electrically conductive fibers are in contact with each other to effectively conduct the current from an energy weapon without harming or incapacitating a wearer of the glove 700. Preferably, the electrically conductive staple fibers are stainless steel; however, any type of electrically conductive staple fibers may be used. Preferably, the non-electrically conductive staple fibers are cotton; however, any type of non-electrically conductive staple fibers may be used. In a most preferred embodiment, each ply 400 of the fabric 704 comprises approximately 60% stainless steel staple fibers and approximately 40% cotton staple fibers.

Preferably, the knit fabric 704 has a gauge of between approximately 10 to 15 and most preferably approximately 13. The knit fabric 704 preferably has a needle count of between approximately 65 to 95, and more preferably between approximately 73 to 88. The needle count used for fabric 704 preferably depends on the size of the glove 700 that is being made with the fabric 704. For example, the needle count for an extra small glove is approximately 73, the needle count for a small glove is approximately 78, the needle count for a medium or large glove is approximately 83, and the needle count for a large or extra large glove is approximately 88. Preferably, each ply 400 of each strand 500 knit into fabric 704 has electrically conductive staple fibers with a length of between approximately 0.4 to 6 inches, more preferably between approximately 1 to 4 inches, and most preferably between approximately 2 to 3 inches. Preferably, the electrically conductive staple fibers of each ply 400 for fabric 704 have a diameter of between approximately 4 to 20 microns, more preferably a diameter of between approximately 6 to 15 microns, and most preferably a diameter of between approximately 8 to 12 microns. In a most preferred embodiment, 95% of the electrically conductive staple fibers used for fabric 704 have a diameter of between 8 to 12 microns and a length of between 2 to 3 inches.

Preferably, each strand 500 used to knit fabric 704 of glove 700 has three plies of staple fibers identical to ply 400 as described above. It is also within the scope of the invention however for each strand 500 to have more or less than three plies. For example, the fabric 704 may be knit from strands comprising two three-ply strands identical to strand 500 that are twisted together. Although glove 700 preferably includes a knit energy protection layer of fabric 704, the glove 700 may also include an energy protection layer of fabric woven from strands containing staple fibers. The energy protection layer 704 of glove 700 is preferably configured to protect a wearer of the glove from an energy weapon capable of generating up to fifty watts of power, more preferably an energy weapon capable of generating between 10 to 50 watts of power, and most preferably an energy weapon capable of generating between 20 to 50 watts of power.

The non-electrically conductive fabric layer 702 may be made from any material and most preferably is made from cotton, nylon, wool, polyester, polyamide, or aramid. The non-electrically conductive fabric layer 702 may also be made from a blend of different types of materials. Preferably, layer 702 is knit; however, it is within the scope of the invention for the layer to be woven.

The inner fabric layer 706 preferably comprises electrically conductive material like layer 704. Preferably, inner fabric layer 706 comprises at least 10% electrically conductive material, and more preferably comprises at least 15% electrically conductive material. The electrically conductive material of the inner fabric layer 706 ensures that if there is a gap in the electrically conductive staple fibers of middle layer 704 then there is a sufficient amount of electrically conductive material in contact with each other to effectively conduct the current from an energy weapon to prevent harm or incapacitation to the wearer thereof. Thus, if there is a gap in the electrically conductive staple fibers of middle layer 704, current can flow from the middle layer 704 to the inner layer 706 to bypass the gap and back to the middle layer 704.

Preferably, the electrically conductive material of inner layer 706 is stainless steel; however, it is within the scope of the invention for the layer 706 to comprise any type of electrically conductive material. Preferably, the inner layer 706 also comprises elastic material such as spandex which enables the inner layer 706 to stretch and tightly conform to the hand of a person wearing the glove. The inner layer 706 may be woven from single plies 400 in the same manner as fabric 410 shown in FIG. 15. The inner layer 706 may also be knit from strands such as strand 500 shown in FIG. 17. The inner layer 706 may be knit with any pattern known in the art including the pattern shown in FIG. 12. Further, it is within the scope of the invention for the inner layer 706 to be woven or knit from plies or strands comprising any number of twisted plies or strands. The inner layer 706 is preferably woven or knit from plies comprising staple fibers of electrically conductive and elastic material, but it may also be woven or knit from plies comprising continuous fibers of electrically conductive and elastic material.

Preferably, the inner, elastic layer 706 is joined with the middle, electrically conductive layer 704 to minimize the gaps between the knit strands 500 of fabric 704 if the glove 700 is stretched. The elastic material of the layer 706 assists in reducing gaps between the knit strands 500 of layer 704. It is important to minimize any gaps between the knit strands 500 of fabric 704 to ensure that enough electrically conductive staple fibers of the strands 500 are in contact with each other to effectively conduct the current from an energy weapon. The above specified ranges for the gauge, needle count, staple fiber length, staple fiber diameter, percent electrically conductive material, number of plies per strand and length per weight for each ply also ensure that the glove 700 will effectively conduct current from an energy weapon to protect its wearer from the effects of the energy weapon. It is also within the scope of the present invention for layers 702, 704, and 706 to be formed into any other type of garment described herein.

In use, the fabric 410, vest 412, strand 500, shirt 600, and glove 700, shown in FIGS. 15, 16, 17, 18, and 20, respectively, operate in a similar manner to protect a wearer thereof from an energy weapon as described above for vest 10, fabric 50, vest 200, or glove 300, shown in FIGS. 1, 5, 6, and 11, respectively. The fabric 410, vest 412, fabric made from strands such as strand 500, shirt 600, and glove 700 are used to cover a portion of a wearer's body to protect the wearer from an energy weapon, such as weapon 16 shown in FIG. 1. If the wearer of any of these garments or fabrics is subjected to a voltage differential between the two leads 38 and 40 (FIG. 3) of the energy weapon, then the electrically conductive staple fibers 402 of each ply 400 or strand 500 making up the garment or fabric 410, 412, 500, 600, and 700 conduct the electric current flowing from one lead of the energy weapon to the other lead of the energy weapon. The electric current flows from one lead to the electrically conductive staple fibers adjacent that lead, through a chain of electrically conductive staple fibers in contact with or adjacent to each other in the fabric or garment between the two leads, and to the opposite lead of the energy weapon. Because the combination of the electrically conductive staple fibers within the fabric 410, vest 412, strand 500, shirt 600, and glove 700 has a much lower electrical resistance than a human body, no electric current flows through the wearer of the respective fabric or garment.

Each fabric 410, vest 412, strand 500, shirt 600, and glove 700 also operates in the same manner as the vest 10, fabric 50, vest 200, and glove 300 to protect a wearer of the fabric or garment in the situation where one barb of an energy weapon contacts or is adjacent to the fabric or garment and the other barb of the energy weapon contacts or is directly adjacent to the intended target of the weapon. Additionally, the fabric 410, vest 412, strand 500, shirt 600, and glove 700 when including heat resistant fibers, penetration resistant fibers, or fibers that promote moisture wicking can protect the wearer thereof from heat, a ballistic missile, a knife, and can provide increased comfort to the wearer in the same manner as described above for vest 10, fabric 50, vest 200, and glove 300.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A method for protecting a person from an energy weapon, comprising:
    positioning a fabric adjacent the person, wherein the fabric comprises a plurality of coupled strands each of which comprises coupled staple fibers, wherein the staple fibers comprise at least 30% electrically conductive material; and
    conducting electric current between a pair of leads of an energy weapon with the strands after the energy weapon is discharged adjacent the strands to prevent the person from becoming incapacitated by the energy weapon when the energy weapon is discharged adjacent to the coupled strands.

2. The method of claim 1, wherein the coupled strands are knit, each of the strands comprises at least three plies each comprising at least 50% electrically conductive staple fibers, and each of the plies comprises a length per weight of between approximately 15,000 to 19,000 yards per pound.

3. The method of claim 2, wherein each of the plies comprises a length per weight of between approximately 16,500 to 17,500 yards per pound.

4. The method of claim 2, wherein the knit strands comprise a gauge of between approximately 10 to 15.

5. The method of claim 4, wherein the knit strands comprise a gauge of approximately 13.

6. The method of claim 4, wherein the knit strands comprise a needle count of between approximately 65 to 95.

7. The method of claim 6, wherein the knit strands comprise a needle count of between approximately 73 to 88.

8. The method of claim 2, wherein at least 60% of the staple fibers of each of the strands comprise stainless steel, and at least 30% of the staple fibers of each of the strands comprise cotton.

9. The method of claim 8, wherein at least 95% of the stainless steel staple fibers comprise a diameter of between 8 to 12 microns and a length of between 2 to 3 inches.

10. The method of claim 1, wherein the coupled strands are woven and each of the strands comprises a length per weight of between approximately 23,000 to 27,000 yards per pound.

11. The method of claim 10, wherein each of the strands comprises a length per weight of between approximately 24,500 to 25,500 yards per pound.

12. The method of claim 10, wherein the woven strands comprise a density of between approximately 160 to 200 threads per inch.

13. The method of claim 12, wherein the woven strands comprise a density of between approximately 175 to 185 threads per inch.

14. The method of claim 10, wherein at least 40% of the staple fibers comprise stainless steel.

15. The method of claim 10, wherein at least 30% of the staple fibers comprise stainless steel, at least 30% of the staple fibers comprise cotton, and at least 30% of the staple fibers comprise polyester.

16. The method of claim 1, wherein a portion of the staple fibers is heat resistant.

17. The method of claim 16, wherein a portion of the staple fibers comprises aramid.

18. The method of claim 1, wherein a portion of the staple fibers is penetration resistant.

19. The method of claim 18, wherein a portion of the staple fibers comprises aramid.

20. The method of claim 18, wherein a portion of the staple fibers comprises polyethylene.

21. The method of claim 1, wherein the electrically conductive staple fibers conduct an electric current from the energy weapon when the energy weapon is adjacent the fibers.

22. The method of claim 1, wherein the combination of the electrically conductive staple fibers of each of the strands protects the person from the energy weapon when the energy weapon delivers up to fifty watts of power to the strands.

23. The method of claim 1, wherein the combination of the electrically conductive material of each of the strands prevents the person from becoming incapacitated when the leads of the energy weapon contact the strands, the strands conduct electric current between the leads of the energy weapon, and the energy weapon delivers fifty watts of power to the strands.

24. A method for protecting a person from an energy weapon, comprising:
    positioning a garment adjacent the person, wherein the garment comprises a fabric comprising a plurality of coupled strands each of which comprises coupled staple fibers, wherein the staple fibers comprise at least 30% electrically conductive material; and
    conducting electric current between a pair of leads of an energy weapon with the strands after the energy weapon is discharged adjacent the strands to prevent the person from becoming incapacitated by the energy weapon when the energy weapon is discharged adjacent to the coupled strands.

25. The method of claim 24, wherein the coupled strands are knit, each of the strands comprises at least three plies each comprising at least 50% electrically conductive staple fibers, and each of the plies comprises a length per weight of between approximately 15,000 to 19,000 yards per pound.

26. The method of claim 25, wherein the fabric comprises a first layer of fabric, and further comprising a second layer of electrically non-conductive fabric joined with and enclosing the first layer of fabric, and a third layer of fabric joined with and enclosed by the first layer of fabric, the first, second, and third layers configured to protect a hand of the person, the third layer comprising at least 10% electrically conductive material.

27. The method of claim 26, wherein the third layer comprises at least 15% electrically conductive material and at least a portion of elastic material.

28. The method of claim 26, wherein each of the plies comprises a length per weight of between approximately 16,500 to 17,500 yards per pound, the knit strands of the first layer of fabric comprise a gauge of between approximately 10 to 15 and a needle count of between approximately 65 to 95.

29. The method of claim 25, wherein the fabric comprises a first layer of fabric, and further comprising a second non-electrically conductive layer of fabric joined with and enclosed by the first layer of fabric, the first and second layers configured to protect a torso of the person.

30. The method of claim 29, wherein each of the plies comprises a length per weight of between approximately 16,500 to 17,500 yards per pound, the knit strands of the first layer of fabric comprise a gauge of between approximately 10 to 15 and a needle count of between approximately 65 to 95.

31. The method of claim 24, wherein the coupled strands are woven and each of the strands comprises a length per weight of between approximately 23,000 to 27,000 yards per pound.

32. The method of claim 31, wherein the garment comprises a ballistic missile resistant vest, the fabric comprises a surface facing the person that is positioned adjacent to a layer of ballistic missile resistant material and another surface facing away from the person that is positioned adjacent to an electrically non-conductive outer shell.

33. The method of claim 32, wherein each of the strands comprises a length per weight of between approximately 24,500 to 25,500 yards per pound, and the woven strands comprise a density of between approximately 160 to 200 threads per inch.

34. The method of claim 33, wherein at least 30% of the staple fibers comprise stainless steel, at least 30% of the staple fibers comprise cotton, and at least 30% of the staple fibers comprise polyester.

* * * * *